United States Patent
Grigg et al.

(10) Patent No.: US 9,331,994 B2
(45) Date of Patent: *May 3, 2016

(54) USER AUTHENTICATION BASED ON HISTORICAL TRANSACTION DATA

(71) Applicant: BANK OF AMERICA CORPORATION, Charlotte, NC (US)

(72) Inventors: David M. Grigg, Rock Hill, SC (US); Peter John Bertanzetti, Charlotte, NC (US); Michael E. Toth, Charlotte, NC (US); Carrie Anne Hanson, Charlotte, NC (US); Elizabeth S. Votaw, Potomac, MD (US)

(73) Assignee: Bank of America Corporation, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/175,701

(22) Filed: Feb. 7, 2014

(65) Prior Publication Data

US 2015/0229623 A1     Aug. 13, 2015

(51) Int. Cl.
*G06F 7/04*     (2006.01)
*G06F 15/16*     (2006.01)
(Continued)

(52) U.S. Cl.
CPC .............. *H04L 63/08* (2013.01); *H04W 12/04* (2013.01); *H04L 2463/082* (2013.01)

(58) Field of Classification Search
CPC ...................................................... H04L 63/08
USPC ............................................................ 726/7
See application file for complete search history.

(56) References Cited

U.S. PATENT DOCUMENTS

| | | |
|---|---|---|
| 5,437,346 A | 8/1995 | Dumont |
| 6,256,670 B1 | 7/2001 | Davies |

(Continued)

OTHER PUBLICATIONS

Tode, Chantal. "Walmart speeds up checkout, lets shoppers scan items via iPhone." Published Sep. 5, 2012. http://www.mobilecommercedaily.com/walmart-speeds-up-checkout-lets-shoppers-scan-items-themselves-via-iphone. Mobile Commerce Daily. 4 pages. Retrieved Mar. 22, 2013.

(Continued)

*Primary Examiner* — Morshed Mehedi
*Assistant Examiner* — Khalil Naghdali
(74) *Attorney, Agent, or Firm* — Michael A. Springs; Moore & Van Allen PLLC; Patrick B. Horne

(57) ABSTRACT

Embodiments are directed to systems, methods and computer program products for providing user authentication based on transaction data. Embodiments receive from a user, a request to execute a user action associated with an application, wherein execution of the user action requires validation of authentication credentials; collect a transaction set of data comprising information related to transactions conducted by the user; collect a location set of data comprising information related to a physical location of the user; determine a transaction proximity score associated with the user and the transactions; determine a level of authentication associated with the determined transaction proximity score; determine which authentication types are associated with the level of authentication; request authentication credentials; receive authentication credentials from the user; validate the authentication credentials, thereby resulting in a successful validation of the authentication credentials; and, in response to the successful validation of the authentication credentials, execute the user action.

17 Claims, 6 Drawing Sheets

(51) Int. Cl.
*G06F 17/30* (2006.01)
*H04L 29/06* (2006.01)
*H04W 12/04* (2009.01)

(56) References Cited

U.S. PATENT DOCUMENTS

| | | |
|---|---|---|
| 7,111,323 B1 | 9/2006 | Bhatia et al. |
| 7,231,202 B2 | 6/2007 | Natsuno |
| 7,239,226 B2 | 7/2007 | Berardi et al. |
| 7,373,515 B2 | 5/2008 | Owen et al. |
| 7,472,081 B1 | 12/2008 | Cason |
| 7,529,741 B2 | 5/2009 | Aravamudan et al. |
| 7,546,276 B2 | 6/2009 | Randle et al. |
| 7,697,920 B1 | 4/2010 | McClain |
| 7,783,281 B1 | 8/2010 | Cook et al. |
| 7,930,264 B2 | 4/2011 | Geppert |
| 7,988,045 B2 | 8/2011 | Connell, II et al. |
| 8,012,219 B2 | 9/2011 | Mendez et al. |
| 8,156,335 B2 | 4/2012 | Lin |
| 8,165,945 B2 | 4/2012 | Collins et al. |
| 8,201,232 B2 | 6/2012 | Zhang et al. |
| 8,214,650 B2 | 7/2012 | Dickinson et al. |
| 8,244,210 B2 | 8/2012 | Ayanamcottil et al. |
| 8,261,093 B1 | 9/2012 | Dhesi et al. |
| 8,270,995 B1 | 9/2012 | Manroa et al. |
| 8,286,227 B1 | 10/2012 | Zheng |
| 8,295,812 B1 | 10/2012 | Jones |
| 8,295,898 B2 | 10/2012 | Ashfield et al. |
| 8,307,412 B2 | 11/2012 | Ozzie et al. |
| 8,332,272 B2 | 12/2012 | Fisher |
| 8,352,323 B1 | 1/2013 | Fisher |
| 8,352,730 B2 | 1/2013 | Giobbi |
| 8,369,833 B2 | 2/2013 | McClain |
| 8,380,177 B2 | 2/2013 | Laracey |
| 8,412,626 B2 | 4/2013 | Hirson et al. |
| 8,423,466 B2 | 4/2013 | Lanc |
| 8,442,915 B2 | 5/2013 | Takatori et al. |
| 8,483,663 B1 | 7/2013 | Jones |
| 8,485,438 B2 | 7/2013 | Dollard |
| 8,601,602 B1 | 12/2013 | Zheng |
| 8,644,506 B2 | 2/2014 | Zellner |
| 8,660,358 B1 * | 2/2014 | Bergboer et al. ............ 382/190 |
| 8,683,571 B2 * | 3/2014 | Zapata et al. ................. 726/9 |
| 8,744,968 B1 | 6/2014 | Grigg et al. |
| 8,768,838 B1 | 7/2014 | Hoffman |
| 8,769,270 B2 * | 7/2014 | Orsini et al. ................. 713/165 |
| 8,869,241 B2 | 10/2014 | Davis et al. |
| 8,869,305 B1 | 10/2014 | Huang |
| 8,881,306 B2 | 11/2014 | Feldman et al. |
| 8,930,271 B1 | 1/2015 | Ellis et al. |
| 8,973,102 B2 * | 3/2015 | Jakobsson ...................... 726/4 |
| 2002/0077978 A1 | 6/2002 | O'Leary et al. |
| 2002/0157029 A1 | 10/2002 | French et al. |
| 2002/0174073 A1 | 11/2002 | Nordman et al. |
| 2003/0065805 A1 | 4/2003 | Barnes, Jr. |
| 2006/0030333 A1 | 2/2006 | Ward et al. |
| 2007/0094152 A1 | 4/2007 | Bauman et al. |
| 2007/0100773 A1 | 5/2007 | Wallach |
| 2007/0156842 A1 | 7/2007 | Vermeulen et al. |
| 2007/0168677 A1 | 7/2007 | Kudo et al. |
| 2007/0219984 A1 * | 9/2007 | Aravamudan et al. ............ 707/5 |
| 2007/0250920 A1 | 10/2007 | Lindsay |
| 2008/0293397 A1 | 11/2008 | Gajdos et al. |
| 2009/0019534 A1 | 1/2009 | Bakshi et al. |
| 2009/0100529 A1 | 4/2009 | Livnat et al. |
| 2009/0150286 A1 | 6/2009 | Barton |
| 2009/0187492 A1 | 7/2009 | Hammad et al. |
| 2009/0199264 A1 | 8/2009 | Lang |
| 2009/0217346 A1 | 8/2009 | Manring et al. |
| 2009/0254975 A1 | 10/2009 | Turnbull et al. |
| 2010/0100897 A1 | 4/2010 | Manuel-Devadoss |
| 2010/0122333 A1 | 5/2010 | Noe |
| 2010/0299262 A1 * | 11/2010 | Handler .............. G06Q 20/10 705/44 |
| 2010/0330958 A1 | 12/2010 | Corda et al. |
| 2011/0016534 A1 | 1/2011 | Jakobsson et al. |
| 2011/0137804 A1 | 6/2011 | Peterson |
| 2011/0142234 A1 | 6/2011 | Rogers |
| 2011/0159846 A1 | 6/2011 | Kemshall |
| 2011/0167440 A1 | 7/2011 | Greenfield |
| 2011/0208601 A1 | 8/2011 | Ferguson et al. |
| 2011/0270618 A1 | 11/2011 | Banerjee et al. |
| 2011/0320296 A1 | 12/2011 | Edwards |
| 2012/0054057 A1 | 3/2012 | O'Connell et al. |
| 2012/0089514 A1 | 4/2012 | Kraemling et al. |
| 2012/0095916 A1 | 4/2012 | Dorsey et al. |
| 2012/0137340 A1 | 5/2012 | Jakobsson et al. |
| 2012/0144461 A1 * | 6/2012 | Rathbun ............... H04L 9/3213 726/5 |
| 2012/0144468 A1 | 6/2012 | Pratt et al. |
| 2012/0160912 A1 | 6/2012 | Laracey |
| 2012/0173551 A1 | 7/2012 | Haddorp et al. |
| 2012/0174237 A1 | 7/2012 | Krzyzanowski |
| 2012/0197743 A1 | 8/2012 | Grigg et al. |
| 2012/0230539 A1 | 9/2012 | Calman et al. |
| 2012/0239576 A1 | 9/2012 | Rose et al. |
| 2012/0254941 A1 | 10/2012 | Levien et al. |
| 2012/0254943 A1 | 10/2012 | Li |
| 2012/0265585 A1 | 10/2012 | Muirbrook et al. |
| 2012/0300938 A1 | 11/2012 | Kean et al. |
| 2012/0316963 A1 | 12/2012 | Moshfeghi |
| 2013/0007874 A1 | 1/2013 | Purvis |
| 2013/0013498 A1 | 1/2013 | Fisher et al. |
| 2013/0030882 A1 | 1/2013 | Davis, III et al. |
| 2013/0030931 A1 | 1/2013 | Moshfeghi |
| 2013/0031003 A1 | 1/2013 | Dorsey et al. |
| 2013/0031004 A1 | 1/2013 | Dorsey et al. |
| 2013/0042314 A1 | 2/2013 | Kelley |
| 2013/0097682 A1 | 4/2013 | Zeljkovic et al. |
| 2013/0097683 A1 | 4/2013 | Davis et al. |
| 2013/0097684 A1 | 4/2013 | Kim |
| 2013/0102283 A1 | 4/2013 | Lau et al. |
| 2013/0111208 A1 | 5/2013 | Sabin et al. |
| 2013/0143621 A1 | 6/2013 | Kumaran |
| 2013/0167207 A1 | 6/2013 | Davis et al. |
| 2013/0173456 A1 | 7/2013 | Grigg et al. |
| 2013/0178233 A1 | 7/2013 | McCoy et al. |
| 2013/0188485 A1 | 7/2013 | Midani et al. |
| 2013/0198056 A1 | 8/2013 | Aldrey et al. |
| 2013/0219454 A1 | 8/2013 | Hewinson |
| 2013/0267204 A1 | 10/2013 | Schultz et al. |
| 2013/0290361 A1 | 10/2013 | Anderson et al. |
| 2014/0130127 A1 | 5/2014 | Toole et al. |
| 2014/0172707 A1 | 6/2014 | Kuntagod |
| 2014/0173704 A1 | 6/2014 | Adams et al. |
| 2014/0195425 A1 * | 7/2014 | Campos ................ G06Q 20/20 705/41 |
| 2014/0208401 A1 * | 7/2014 | Balakrishnan et al. ........... 726/5 |
| 2014/0279270 A1 | 9/2014 | Bertanzetti et al. |
| 2014/0289821 A1 | 9/2014 | Wilson |
| 2014/0310764 A1 * | 10/2014 | Tippett et al. .................... 726/1 |
| 2014/0315159 A1 * | 10/2014 | Mukherjee et al. .......... 434/107 |
| 2015/0032621 A1 | 1/2015 | Kar et al. |
| 2015/0120572 A1 | 4/2015 | Slade |
| 2015/0213474 A1 * | 7/2015 | Howe .......................... 705/14.35 |

OTHER PUBLICATIONS

RISNews.edgl.com. "Supermarket Retailer Rolls Out Self-Checkout Smartphone App." http://risnews.edgl.com/retail-news/Supermarket-Retailer-Rolls-Out-Self-Checkout-Smartphone-App81027 2 pages. Retrieved Mar. 9, 2013.

QThru.com. "QThru: use your mobile smartphone for self-checkout." http://www.qthru.com/. QThru.com © 2011. 6 pages. Retrieved Mar. 22, 2013.

Zimmerman, Ann. "Check Out the Future of Shopping: Shaving Time Off the Weekly Grocery Run to Keep Consumers in Stores and Spending." http://online.wsj.com/article/SB10001424052748703421204576329253050637400.html. 5 pages. Retrieved Mar. 22, 2013.

\* cited by examiner

US 9,331,994 B2

USER AUTHENTICATION BASED ON HISTORICAL TRANSACTION DATA

BACKGROUND

In the new technological age, the security of personal information, or the lack thereof, has become an issue that concerns many people. As a result, several business industries, such as financial institutions, have taken precautionary measures to ensure the safety and protection of their customers' information. This is typically accomplished by verifying a user's identity prior to transferring any personal information using an electronic means.

BRIEF SUMMARY

Embodiments of the invention provide user authentication based on transaction data. According to embodiments, an apparatus includes a memory; a processor; and a module stored in the memory, executable by the processor, and configured to receive from a user, a request to execute a user action associated with an application, wherein execution of the user action requires validation of one or more authentication credentials; collect a transaction set of data comprising information related to one or more transactions conducted by the user; collect a location set of data comprising information related to a physical location of the user; determine a transaction proximity score associated with the user and the one or more transactions; determine a level of authentication associated with the determined transaction proximity score; determine which one or more authentication types from a plurality of authentication types are associated with the level of authentication associated with the transaction proximity score; request one or more authentication credentials corresponding to the determined one or more authentication types; receive one or more authentication credentials from the user; validate the one or more authentication credentials, thereby resulting in a successful validation of the one or more authentication credentials; and, in response to the successful validation of the one or more authentication credentials, execute the user action.

In some embodiments, determining the transaction proximity score associated with the user and the one or more transactions comprises determining a time that has lapsed since completion of the one or more transactions; determining a proximity threshold associated with the one or more transactions and the elapsed time; determining whether the user is within the proximity threshold; and, based at least in part on the determination, assigning the transaction proximity score. In some such embodiments, determining the transaction proximity score further comprises selecting one or more second transactions of the user; determining a second proximity threshold associated with the one or more second transactions of the user; determining whether the user is within the second proximity threshold; and wherein determining the transaction proximity score is further based at least in part on the determination of whether the user is within the second proximity threshold. In some of these embodiments, determining the transaction proximity score comprises determining a first partial score based at least in part on the determination of whether the user is within the proximity threshold, wherein the first partial score is weighted by a first weighting factor; determining a second partial score based at least in part on the determination of whether the user is within the second proximity threshold, wherein the second partial score is weighted by a second weighting factor; and combining the first partial score and the second partial score, thereby determining the transaction proximity score. In some of these embodiments, at least one of the first weighting factor and the second weighting factor are based on the elapsed time since their respective transactions occurred.

In some embodiments, determining the transaction proximity score comprises determining a historical transaction pattern associated with the user; determining whether the transaction set of data indicates a current transaction pattern that falls within a predetermined acceptable variance of the historical transaction pattern; and, if not, determining the transaction proximity score based at least in part on a variance of the current transaction pattern from the historical transaction pattern.

In some embodiments, determining the transaction proximity score comprises determining a historical transaction pattern associated with the user; and determining the transaction proximity score based at least in part on a variance of the current transaction pattern from the historical transaction pattern.

According to embodiments of the invention, a method for user authentication based on transaction data includes receiving from a user, a request to execute a user action associated with an application, wherein execution of the user action requires validation of one or more authentication credentials; collecting a transaction set of data comprising information related to one or more transactions conducted by the user; collecting a location set of data comprising information related to a physical location of the user; determining a transaction proximity score associated with the user and the one or more transactions; determining a level of authentication associated with the determined transaction proximity score; determining which one or more authentication types from a plurality of authentication types are associated with the level of authentication associated with the transaction proximity score; requesting one or more authentication credentials corresponding to the determined one or more authentication types; receiving one or more authentication credentials from the user; validating the one or more authentication credentials, thereby resulting in a successful validation of the one or more authentication credentials; and, in response to the successful validation of the one or more authentication credentials, executing the user action.

In some embodiments, determining the transaction proximity score associated with the user and the one or more transactions comprises determining a time that has lapsed since completion of the one or more transactions; determining a proximity threshold associated with the one or more transactions and the elapsed time; determining whether the user is within the proximity threshold; and based at least in part on the determination, assigning the transaction proximity score. In some such embodiments, determining the transaction proximity score further comprises selecting one or more second transactions of the user; determining a second proximity threshold associated with the one or more second transactions of the user; determining whether the user is within the second proximity threshold; and wherein determining the transaction proximity score is further based at least in part on the determination of whether the user is within the second proximity threshold. In some of these embodiments, determining the transaction proximity score comprises determining a first partial score based at least in part on the determination of whether the user is within the proximity threshold, wherein the first partial score is weighted by a first weighting factor; determining a second partial score based at least in part on the determination of whether the user is within the second proximity threshold, wherein the second partial score is weighted by a second weighting factor; and combining the first partial score and the second partial score, thereby determining the transaction proximity score. In some of these embodiments, at least one of the first weighting factor and the second weighting factor are based on the elapsed time since their respective transactions occurred.

In some embodiments, determining the transaction proximity score comprises determining a historical transaction pattern associated with the user; determining whether the transaction set of data indicates a current transaction pattern that falls within a predetermined acceptable variance of the historical transaction pattern; and, if not, determining the transaction proximity score based at least in part on a variance of the current transaction pattern from the historical transaction pattern.

In some embodiments, determining the transaction proximity score comprises determining a historical transaction pattern associated with the user; and determining the transaction proximity score based at least in part on a variance of the current transaction pattern from the historical transaction pattern.

According to embodiments of the invention, a computer program product includes a non-transitory computer-readable medium comprising code causing a first apparatus to receive from a user, a request to execute a user action associated with an application, wherein execution of the user action requires validation of one or more authentication credentials; collect a transaction set of data comprising information related to one or more transactions conducted by the user; collect a location set of data comprising information related to a physical location of the user; determine a transaction proximity score associated with the user and the one or more transactions; determine a level of authentication associated with the determined transaction proximity score; determine which one or more authentication types from a plurality of authentication types are associated with the level of authentication associated with the transaction proximity score; request one or more authentication credentials corresponding to the determined one or more authentication types; receive one or more authentication credentials from the user; validate the one or more authentication credentials, thereby resulting in a successful validation of the one or more authentication credentials; and, in response to the successful validation of the one or more authentication credentials, execute the user action. In some such embodiments, determining the transaction proximity score associated with the user and the one or more transactions comprises determining a time that has lapsed since completion of the one or more transactions; determining a proximity threshold associated with the one or more transactions and the elapsed time; determining whether the user is within the proximity threshold; and, based at least in part on the determination, assigning the transaction proximity score. In some of these embodiments, determining the transaction proximity score further comprises selecting one or more second transactions of the user; determining a second proximity threshold associated with the one or more second transactions of the user; determining whether the user is within the second proximity threshold; and wherein determining the transaction proximity score is further based at least in part on the determination of whether the user is within the second proximity threshold. In some such embodiments, determining the transaction proximity score comprises determining a first partial score based at least in part on the determination of whether the user is within the proximity threshold, wherein the first partial score is weighted by a first weighting factor; determining a second partial score based at least in part on the determination of whether the user is within the second proximity threshold, wherein the second partial score is weighted by a second weighting factor; and combining the first partial score and the second partial score, thereby determining the transaction proximity score. In some of these embodiments, at least one of the first weighting factor and the second weighting factor are based on the elapsed time since their respective transactions occurred. In some embodiments, determining the transaction proximity score comprises determining a historical transaction pattern associated with the user; determining whether the transaction set of data indicates a current transaction pattern that falls within a predetermined acceptable variance of the historical transaction pattern; and, if not, determining the transaction proximity score based at least in part on a variance of the current transaction pattern from the historical transaction pattern.

BRIEF DESCRIPTION OF THE DRAWINGS

Figure 1A:
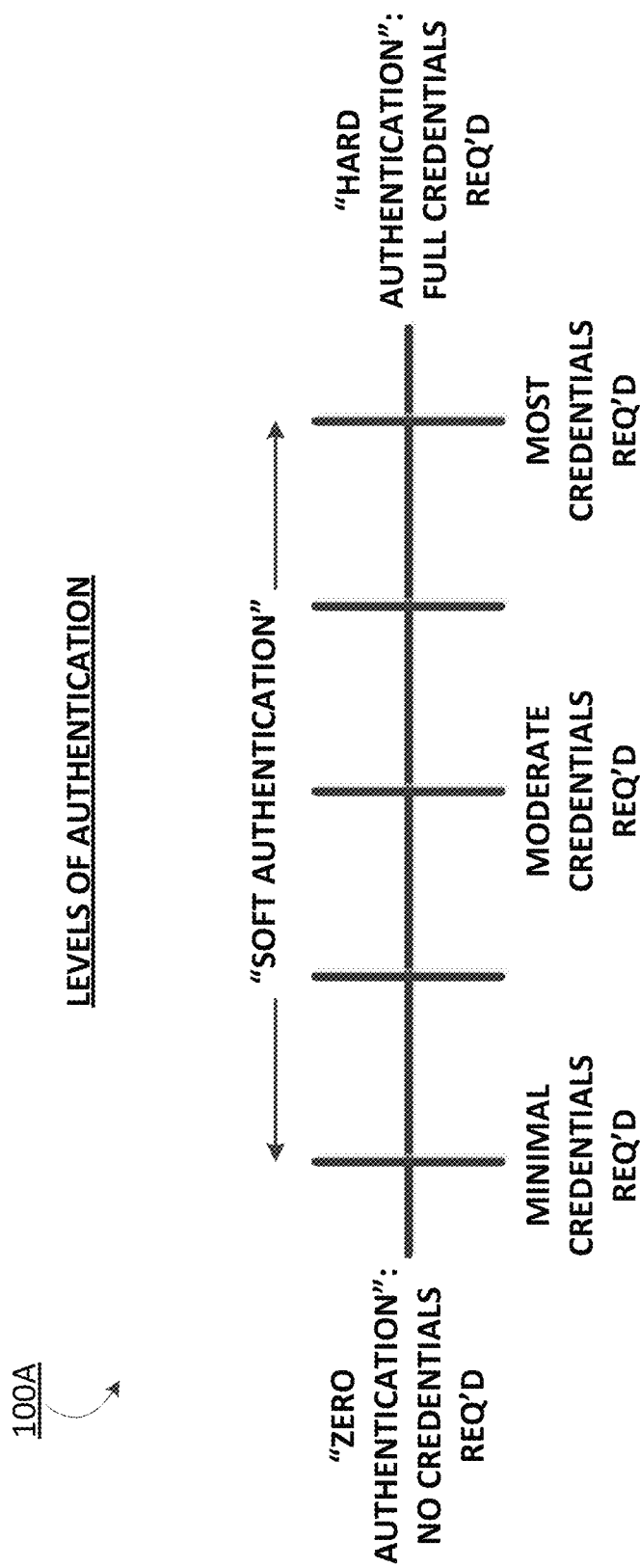
Figure 1B:
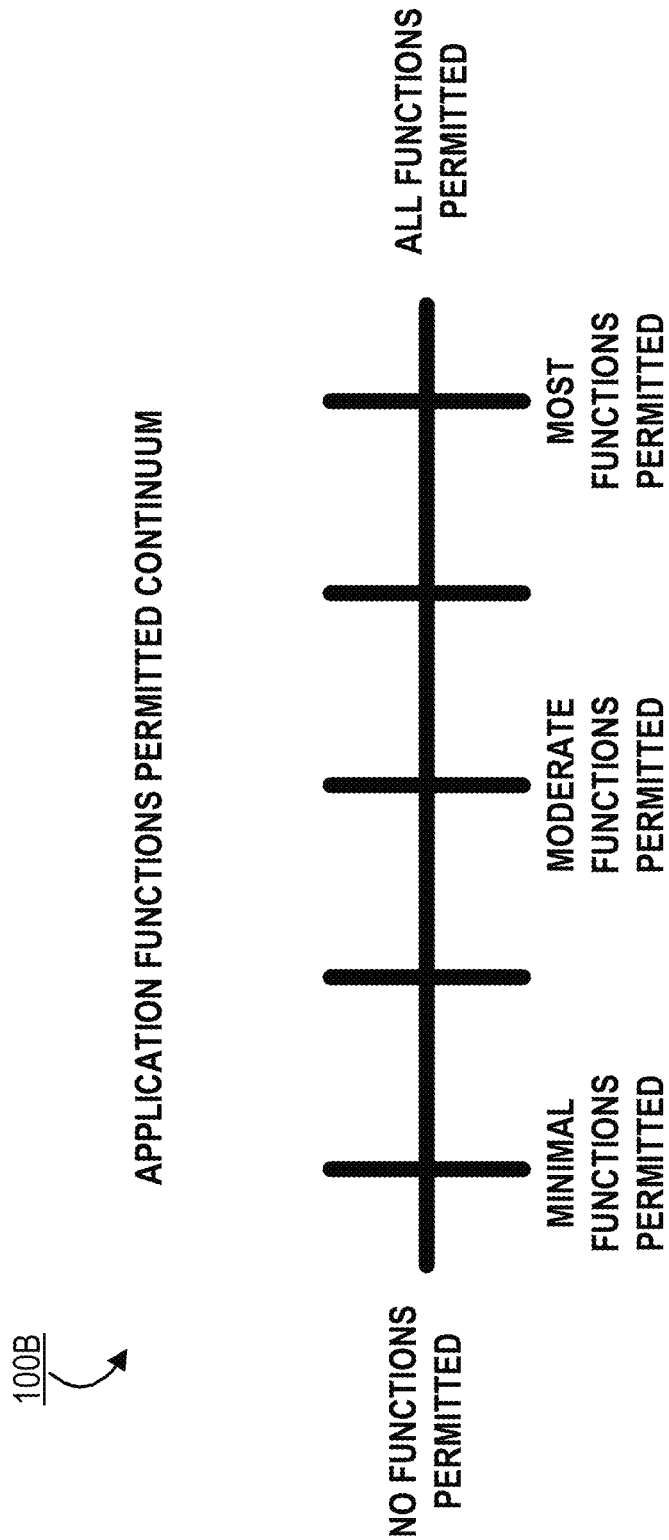
Figure 1C:
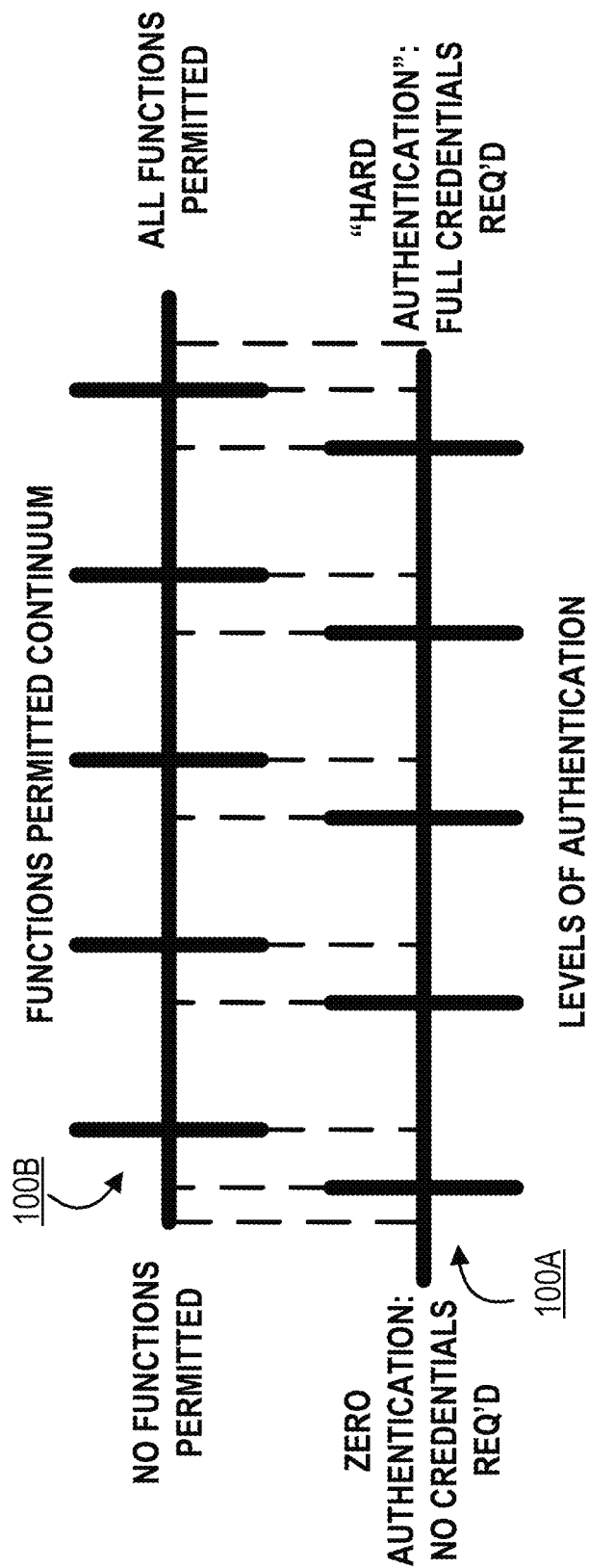
Figure 2:
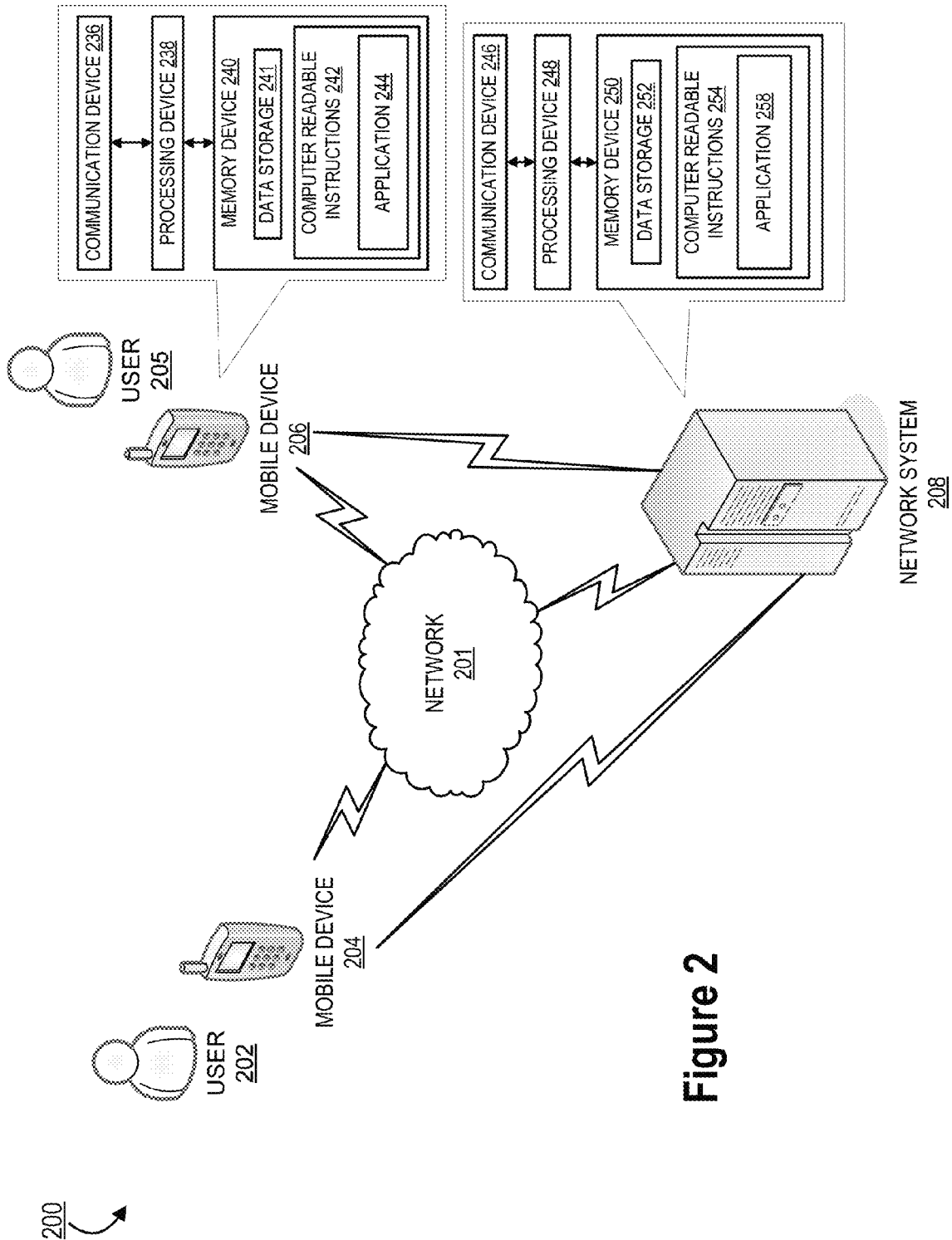
Figure 3A:
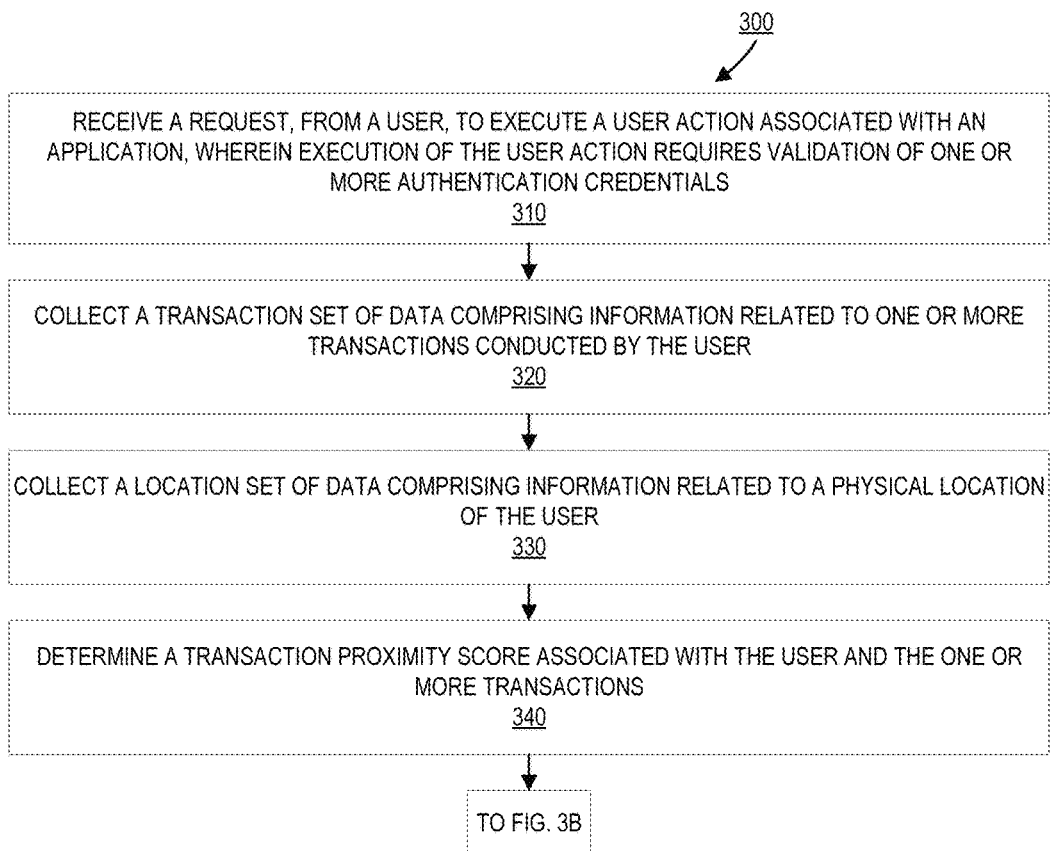
Figure 3B:
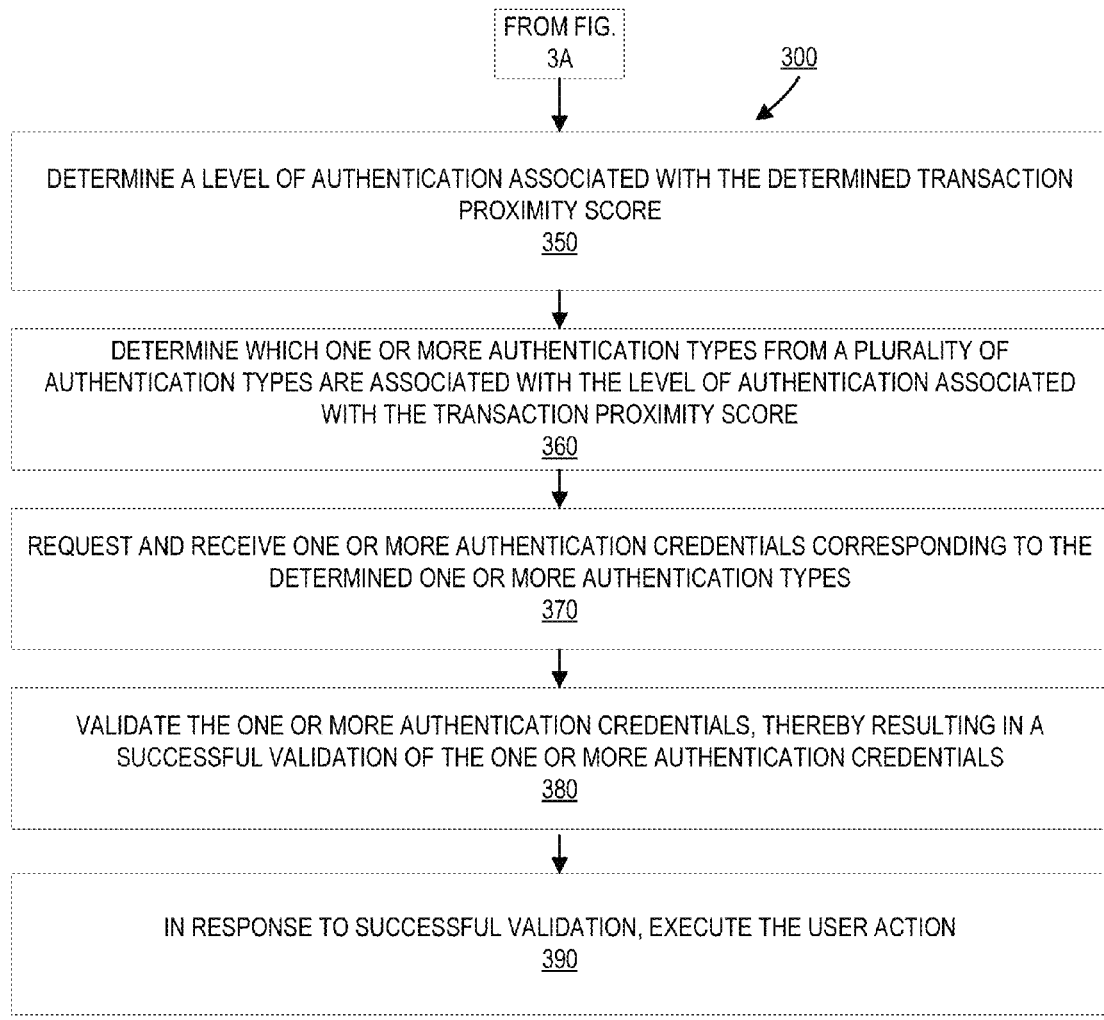

Having thus described embodiments of the invention in general terms, reference will now be made to the accompanying drawings, where:

FIG. 1A provides a diagram illustrating an authentication continuum, in accordance with an embodiment of the present invention;

FIG. 1B provides a diagram illustrating an application functions permitted continuum, in accordance with an embodiment of the present invention;

FIG. 1C provides a diagram illustrating multiple continuums, in accordance with an embodiment of the present invention;

FIG. 2 provides a diagram illustrating a network environment for providing authentication using previously-validated authentication credentials, in accordance with an embodiment of the present invention; and FIGS. 3A and 3B provides a flow diagram illustrating a method for user authentication based on transaction data, in accordance with embodiments of the invention.

DETAILED DESCRIPTION OF EMBODIMENTS OF THE INVENTION

Embodiments of the present invention now may be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

User authentication may be required in a variety of situations. For example, a user may be required to authenticate identity for access to an application on a computer system or a mobile device or for access to a particular feature, function or action of an application. Numerous types and levels of user authentication exist. For example, a user may authenticate his or her identity using a unique alias such as a username and/or password. Further, in some situations, challenge questions, familiar pictures and/or phrases, biometrics, key fob-based alphanumeric codes and/or collocation, authentication of another application such as a similar application or an "overarching" application, and/or the like may be used as types of identity authentication.

The different types of authentication may provide differing degrees of confidence regarding the authentication using such types. For example, if a username by itself is used for a first user authentication, and a username along with a password is used for a second authentication, then the second authentication should provide a higher confidence regarding the authentication because of the additional layer of authentication required. Further, within the types of authentication, varying levels of confidence may be used. For example, when using a password, an administrator may require users to create a password according to strict rules designed to increase the security level of the password, and therefore increase the confidence of any authentication using the password.

Accordingly, a continuum of authentication may be used to quantify (or dictate) the levels of authentication. Likewise, a continuum of functions permitted may be used to quantify (or dictate) the number or context in which functions are permitted.

Referring to FIG. 1A, a continuum of authentication 100A is illustrated according to embodiments of the invention. On the left-hand side of the continuum, a "zero authentication" requires no authentication credentials. On the right-hand side of the continuum, a "hard authentication" requires full authentication credentials. This means that it requires the strictest combination of credentials. In between the two extremes, "a soft authentication" requires minimal credentials, moderate credentials or most credentials for various points along the continuum. The continuum generally represents the number of credentials required and/or the relative strength of the credentials required for that point on the continuum. As discussed below with reference to FIG. 1C, the continuum of authentication 100A may be coupled with an application functions permitted continuum 100B, first illustrated in FIG. 1B.

Referring to FIG. 1B, the application functions permitted continuum 100B illustrates various levels of application functions permitted. Functions may refer to what a user is permitted to "see" and/or what the user is permitted to "do". More specifically, this may refer to whether a specific function is permitted at a certain point on the continuum and/or the context in which a certain function is permitted. The left-hand side of the continuum indicates that no functions are permitted, and the right-hand side of the continuum indicates that all functions are permitted. In between the extremes, minimal functions are permitted, moderate functions are permitted and most functions are permitted. Thus, any given point along the continuum 100B corresponds with a certain amount and/or number of functions that are permitted and/or the context in which certain functions are permitted.

Referring now to FIG. 1C, a diagram 100C illustrates a coupling of the application functions permitted continuum 100B and the levels of authentication continuum 100A. As shown, the continua 100B and 100A may be coupled with one another such that the various points along the continua intersect at specific points of the coupled continuum. For example, one continuum may be moved left or right with respect to the other continuum in order to achieve a different relationship between the functions permitted and the credentials required. Accordingly, for a given coupling, a specific point on continuum 100B provides that a particular function or functions may be permitted given that a specified level of authentication credentials are supplied, as indicated by the corresponding point on continuum 100A. For example, a financial institution and/or a user may arrange the continua 100B and 100A with respect to one another and may adjust the arrangement based on changing desires or goals.

In some embodiments, one or both the continua 100B and 100A may have weighted scales such that, as a point on the continuum is moved, the corresponding functions permitted and/or level of authentication required may change exponentially or otherwise. Furthermore, in various embodiments, other representations of the various functions permitted that correspond with the various levels of authentication may be used by the invention.

Referring now to FIG. 2, a network environment 200 is illustrated in accordance with one embodiment of the present invention. As illustrated in FIG. 2, the network system 208 is operatively coupled, via a network 201 to the mobile device 204 and/or 206. In this configuration, the network system 208 may send information to and receive information from the mobile device devices 204 and/or 206. The network system 208 may be or include one or more network base stations or other network components. FIG. 2 illustrates only one example of an embodiment of a network environment 200, and it will be appreciated that in other embodiments one or more of the systems, devices, or servers may be combined into a single system, device, or server, or be made up of multiple systems, devices, or servers.

The network 201 may be a global area network (GAN), such as the Internet, a wide area network (WAN), a local area network (LAN), a telecommunication network or any other type of network or combination of networks. The network 201 may provide for wireline, wireless, or a combination wireline and wireless communication between devices on the network 201.

In some embodiments, the users 202 and 205 are individuals who maintain cellular products with one or more providers.

As illustrated in FIG. 2, the network system 208 generally comprises a communication device 246, a processing device 248, and a memory device 250. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 248 is operatively coupled to the communication device 246 and the memory device 250. The processing device 248 uses the communication device 246 to communicate with the network 201 and other devices on the network 201. As such, the communication device 246 generally comprises a modem, server, or other device for communicating with other devices on the network 201.

As further illustrated in FIG. 2, the network system 208 comprises computer-readable instructions 254 stored in the memory device 250, which in one embodiment includes the computer-readable instructions 254 of an application 258. In some embodiments, the memory device 250 includes data storage 252 for storing data related to and/or used by the application 258. The application 258 may perform a user authentication by performing one or more of the steps and/or sub-steps discussed herein.

As illustrated in FIG. 2, the mobile device 206 generally comprises a communication device 236, a processing device 238, and a memory device 240. The processing device 238 is operatively coupled to the communication device 236 and the memory device 240. In some embodiments, the processing device 238 may send or receive data from the mobile device 204, and/or the network system 208 via the communication device 236 over a network 201. As such, the communication device 236 generally comprises a modem, server, or other device for communicating with other devices on the network 201.

As further illustrated in FIG. 2, the mobile device 206 comprises computer-readable instructions 242 stored in the memory device 240, which in one embodiment includes the computer-readable instructions 242 of an application 244. In the embodiment illustrated in FIG. 2, the application 244 allows the mobile device 206 to be linked to the network system 208 to communicate, via a network 201. The application 244 may also allow the mobile device 206 to connect directly (i.e., locally or device to device) with the mobile device 204 for proximity services (e.g., using either cellular based links or non-cellular based links). The application 244 may perform a user authentication by performing one or more of the steps and/or sub-steps discussed herein.

It is understood that the servers, systems, and devices described herein illustrate one embodiment of the invention. It is further understood that one or more of the servers, systems, and devices can be combined in other embodiments and still function in the same or similar way as the embodiments described herein.

Various embodiments relate to user authentication using the mobile device of the user by tracking the user's transaction history and the locations transactions were made. In a particular embodiment, the system may require a lower form of authentication if it confirms information indicating that the person accessing the account has performed a recent transaction close-by to the current request, thereby improving the likelihood that the user's identity is valid.

For example, if an authentication attempt originates from a location proximate a recent transaction, then it is more likely the authentication originates from the user him or herself. Accordingly, authentication may be linked to card-based transactions or other transactions for added confidence in the authentication.

Different levels of authentication may be required in different implementations. For example, if the user is within a predetermined threshold of the location of a recent card transaction, then a lower level of authentication may be required for the request. As another example, if the user is within a large predetermined threshold of a recently performed transaction or outside a predetermined boundary associated with a recent transaction, then hard authentication may be requires for the request.

Referring now to FIG. 3A, a flowchart illustrates a method 300 for user authentication based on transaction data. The first step, represented by block 310, is to receive a request, from a user, to execute a user action associated with an application, where execution of the user action requires validation of one or more authentication credentials. Typically, the application may include one or more user actions or functions. For example, a mobile financial application may include functions such as a funds transfer, a check deposit, a balance check, a bill pay, or the like. In another example, the user action may be checking account balance, executing a money transfer, initiating a bill pay to a merchant, or the like.

The next step, represented by block 320, is to collect a transaction set of data comprising information related to one or more transactions conducted by the user. The set of data may include data from transactions performed very recently, such as in the last few minutes or hours and/or transactions performed in the last few days, weeks, months and/or years. In some cases, only more recent transactions are used for the method and in some cases older transactions are used to determine transaction patterns.

The next step, represented by block 330, is to collect a set of data comprising information related to a physical location of the user. This set of data may be collected from a variety of sources and may include data drawn from one or more of the sources. The set of data may include positioning data of the customer, consistent with embodiments of the present invention.

The positioning data may include global positioning data. Global positioning data may include any information collected from methods, systems, apparatus, computer programs etc. involving locating a user's position relative to satellites, fixed locations, beacons, transmitters or the like. In some instances, global positioning data may be collected from a GPS device, such as a navigation system. Such a navigation system may be, but is not limited to, hardware and/or software that is part of a mobile phone, smartphone, PDA, automobile, watch etc. or a commercially available personal navigation system or the like. The amount, nature and type of the global positioning data that is collected may depend on the merchant's relationship with the customer and the amount of information that the customer has authorized the merchant or third-party provider to collect.

For instance, in some embodiments, the global positioning data will be snapshots of the user's location at different times. For example, a snapshot of the user's location may be collected each time the GPS software, navigation system or application is activated. The global positioning data may also include the destination entered by the user, recent searches for locations, attractions, addresses etc. In other instances, the global positioning data may be the complete route being provided to the GPS system's user, including destination, route, alternate routes, anticipated time of arrival etc. In some such embodiments, the global positioning data may include an indication if the customer selects a detour from a previously selected route, or instructs the navigation system to reach the desired location taking specific roads or avoiding certain roads.

Positioning data of the customer may include mobile device data. Mobile device data may include information regarding the location of the customer's mobile device. Such a mobile device may include, but is not limited to, a cellular telecommunications device (i.e., a cell phone or mobile phone), personal digital assistant (PDA), smartphone, a mobile Internet accessing device, or other mobile device including, but not limited to portable digital assistants (PDAs), pagers, gaming devices, laptop computers, tablet computers, and any combination of the aforementioned, or the like. For instance, the location of the mobile phone may be dynamically determined from the cell phone signal and cell towers being accessed by the mobile phone. In other instances, a mobile device may include software or hardware to locate the position of the mobile phone from GPS signals, wireless network locations, and the like. Mobile device data may further include information from an accelerometer that is a part of the mobile device and provides information regarding whether the mobile device is moving, and if so, in what direction. In some embodiments, mobile device data may be the time and location of calls placed using the telephone functionality of a mobile device. In yet other embodiments, the mobile device data may be data collected and analyzed by the hardware and/or software of the mobile device concerning the surrounding environment. In such embodiments, hardware, such as a video capture device, camera or the like and software that is stored in the memory of a mobile device captures a video stream of the environment surrounding the mobile device and through object recognition, compass direction, the location of the mobile device, and other such data identifies information about the objects identified in the surrounding environment and/or the environment itself. For example, in use, a user may use the camera built into her smartphone to collect a real-time video stream that includes images of the façade of a store front and the surrounding area. This image may include the store's name from a marquee, a street address (collected from an image of the numbers on the building and of street signs in the video image) and the direction the smartphone is facing (from a compass in the mobile device). Such information may be sufficient to locate the user's position and potentially the direction the user is facing and/or traveling.

Positioning data of the customer may also be collected from social network data. It will also be understood that "social network" as used herein, generally refers to any social structure made up of individuals (or organizations) which are connected by one or more specific types of interdependency, such as kinship, friendship, common interest, financial exchange, working relationship, dislike, relationships, beliefs, knowledge, prestige, geographic proximity etc. The social network may be a web-based social structure or a non-web-based social structure. In some embodiments, the social network may be inferred from financial transaction behavior, mobile device behaviors, etc. The social network may be a network unique to the invention or may incorporate already-existing social networks as well as any one or more existing web logs or "blogs," forums and other social spaces. Social network data may indicate the customer's recent, present or future location through expressed data. For instance, a user may upload a blog post, comment on a connection's page, send a friend an electronic message etc. that she is traveling to a specific location or that she is currently in a specific city, or on a specific road etc. Moreover, many already-existing social networks provide users with the ability to "check-in", "flag" or otherwise indicate the user's current location. Accordingly, customer positioning data collected from social networking data may consist of such indications. Furthermore, many social networks allow users to rate, like, comment etc. on restaurants, attractions, locations and the like. Accordingly, a customer may indicate that she ate at a certain restaurant or business at a given time and thereby provide information about her location at that time. Furthermore, a customer may upload photographs to a social networking site and thereby provide information about the customer's location. In some instances the customer's location may be determined from the picture, (for example a picture of a state line sign, a highway sign, a mile marker etc.) or a caption associated with the picture may indicate the customer's location and/or the time the photo was taken.

Positioning data of the customer may also be collected from Internet data. Internet data, may include any information relating to the searches conducted by the customer, website's visited by the customer and the like that suggests the customer's present or future location(s). For instance, in preparing for a vacation a customer may conduct searches for hotels, restaurants or activities in the area where the customer will be staying. Similarly, a customer may review weather forecasts for locations other than her place of residence indicating that she may soon be traveling to that location. A customer may also search for construction or traffic reports indicating future travel along certain roads. Moreover, changes in search patterns may suggest a customer's future location. For instance if a customer usually uses a web browser application just to read online news articles or to check sports scores but suddenly begins to search for camping gear, hiking manuals and boots it may be indicative that the customer is anticipating taking a hiking trip and will be traveling away from her home area. It will be understood that such Internet data may relate to searches or websites visited by the customer before she began traveling, however, inasmuch as many mobile devices also include mobile Internet connectivity, it will also be understood that such information may be dynamically collected as the customer travels.

The next step, represented by block 340, is to determine a transaction proximity score associated with the user. The transaction proximity score is a quantification or how close geographically the user is to one or more transaction that were recently performed by the user and/or to an historical pattern of transactions of the user, and therefore, indicates a relative level of potential exposure for a user request. Methods for determining the transaction proximity score are discussed below.

Referring now to FIG. 3B, the next step, represented by block 350, is to determine a level of authentication associated with the determined transaction proximity score. Then, the system may be configured to determine which one or more authentication types from a plurality of authentication types are associated with the level of authentication associated with the transaction proximity score, as shown in block 360. As illustrated in at least FIG. 1A, the one or more authentication levels may include a hard authentication, a soft authentication, and a zero authentication. In one aspect, the authentication types may include a username, a password, a personal identification number, biometric data, or the like. In some embodiments, each authentication level may include one or more authentication types in the continuum of authentication.

In response to determining one or more authentication types, the system may be configured to request one or more authentication credentials corresponding to the determined one or more authentication types, as shown in block 370. In response to requesting one or more authentication credentials, the system may be configured to receive one or more authentication credentials from the user and validate the one or more authentication credentials, thereby resulting in a successful validation of the one or more authentication credentials, as shown in blocks 370 and 380. In response to successful validation of the one or more authentication credentials, the system may then be configured to execute the user action, as shown in block 390. In one aspect, a successful validation may include determining a successful match between the one or more authentication credentials received from the user and the one or more authentication credentials stored in a database, wherein the one or more authentication credentials correspond to the one or more authentication types associated with the level of authentication.

Determining the transaction proximity score (see FIG. 3, block 340) may be done in a variety of methods. For example, in some embodiments, determining the transaction proximity score includes determining a time that has lapsed since completion of the one or more transactions. Next, a proximity threshold associated with the one or more transactions and the elapsed time may be determined. This may be done by accessing a database that includes a listing of pairs and/or ranges of proximity thresholds and/or elapsed times. Then, the proximity threshold is used to determine whether the user's request falls within the proximity threshold. For example, if the user performed a transaction ten minutes prior to the request within one mile of the request, then a proximity threshold of five miles maybe associated with the time since the transaction. In such a case, because the user's one mile distance falls below the proximity threshold of five miles, then an appropriate transaction proximity score may be assigned. Again, this assignment may be performed by accessing another or the same database to determine the score associated with the distance of one mile from the transaction that occurred ten minutes ago.

In some embodiments, determining the transaction proximity score also includes selecting one or more second transactions of the user and determining a second proximity threshold associated with the one or more second transactions of the user. This may be performed as described above. The next steps are determining whether the user is within the second proximity threshold, where determining the transaction proximity score is further based at least in part on the determination of whether the user is within the second proximity threshold.

In some cases, determining the transaction proximity score also includes determining a first partial score based at least in part on the determination of whether the user is within the proximity threshold, wherein the first partial score is weighted by a first weighting factor; and determining a second partial score based at least in part on the determination of whether the user is within the second proximity threshold, wherein the second partial score is weighted by a second weighting factor; and then combining the first partial score and the second partial score, thereby determining the transaction proximity score. The weighting factors may represent the proximity threshold range into which the user's distance from the transaction resides. For example, there may be multiple proximity thresholds and each may be assigned a weighting factor, such as a "1" for a proximity threshold of one mile and a "0.5" for a proximity threshold of five miles, etc.

In various embodiments, determining the transaction proximity score comprises determining a historical transaction pattern associated with the user; determining whether the transaction set of data indicates a current transaction pattern that falls within a predetermined acceptable variance of the historical transaction pattern; and, if not, determining the transaction proximity score based at least in part on a variance of the current transaction pattern from the historical transaction pattern. In other embodiments, determining the transaction proximity score comprises determining a historical transaction pattern associated with the user; and determining the transaction proximity score based at least in part on a variance of the current transaction pattern from the historical transaction pattern.

In various embodiments, the level of user authentication may also be based in part on validating an identity of the mobile device of the user. Such verification can be incorporated into the close network score or into a unique identity score that is combined with the close network score in order to determine the appropriate level of authentication required for a requested action/function. The identity of the mobile device may be determined in a variety of ways. For example, a particular mobile device may be identified by gathering device identification information from the mobile device to generate the device's "fingerprint," or unique signature of the mobile device. Device identification information may be collected from a variety of sources. In some embodiments, the device identification information includes an identification code. The identification code may be but is not limited to a serial number or an item number of the device. In some embodiments, the device identification information may be associated with a chip associated with the mobile device. The chip may be but is not limited to a subscriber identification module (SIM) card, removable hard drive, processor, microprocessor, or the like. In other embodiments, the device identification information may be associated with a removable part of the mobile device. Removable parts include but are not limited to detachable keyboards, battery covers, cases, hardware accessories, or the like. Removable parts may contain serial numbers or part numbers. In alternative embodiments, a unique key, code, or piece of software provided by a financial institution may be downloaded onto the mobile device. This unique key, code, or piece of software may then serve as device identification information. Typically, the device identification information (e.g., a serial number, an identification code, an International Mobile Station Equipment Identity (IMEI), a phone number, a chip, a removable part, or similar pieces of device identification information) is collected from the mobile device without requiring user input. For example, the device identification information may be automatically provided by the mobile device. Alternatively, the mobile device may provide the information without requiring user input after receiving a request from a system for the identification information. In other embodiments, device identification information may be entered manually at the mobile device. For example, if the mobile device's serial number cannot be automatically located (perhaps due to interference, long range, or similar hindrance), the user may be prompted for manual entry of the serial number (or an identification code, an International Mobile Station Equipment Identity (IMEI), a phone number, a chip, a removable part, or similar pieces of device identification information). The device identification information may be stored and subsequently used to identify the mobile device.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. As used herein, "at least one" shall mean "one or more" and these phrases are intended to be interchangeable. Accordingly, the terms "a" and/or "an" shall mean "at least one" or "one or more," even though the phrase "one or more" or "at least one" is also used herein. Like numbers refer to like elements throughout.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, microcode, stored procedures in a database, etc.), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g., a memory, etc.) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

To supplement the present disclosure, this application further incorporates entirely by reference the following commonly assigned patent applications:

| U.S. Patent Application Ser. No. | Title | Filed On |
| --- | --- | --- |
| 14/175,639 (now published as U.S. Patent Application Publication No. 2015/0227926 | DETERMINING USER AUTHENTICATION REQUIREMENTS BASED ON THE CURRENT LOCATION OF THE USER IN COMPARISON TO A USERS'S TRAVEL ROUTE | Concurrently Herewith |
| 14/175,643 (now published as U.S. Patent Application Publication No. 2015/0227727 | DETERMINING USER AUTHENTICATION REQUIREMENTS BASED ON THE CURRENT LOCATION OF THE USER IN COMPARISON TO THE USERS'S NORMAL BOUNDARY OF LOCATION | Concurrently Herewith |
| 14/175,646 (now published as U.S. Patent Application Publication No. 2015/0227728 | DETERMINING USER AUTHENTICATION REQUIREMENTS BASED ON THE CURRENT LOCATION OF THE USER BEING WITHIN A PREDETERMINED AREA REQUIRING ALTERED AUTHENTICATION REQUIREMENTS | Concurrently Herewith |
| 14/175,947 (now published as U.S. Patent Application Publication No. 2015/0229624 | USER AUTHENTICATION BASED ON HISTORICAL USER BEHAVIOR | Concurrently Herewith |
| 14/175,954 (now published as U.S. Patent Application Publication No. 2015/0229650 | USER AUTHENTICATION BY GEO-LOCATION AND PROXIMITY TO USER'S CLOSE NETWORK | Concurrently Herewith |
| 14/175,863 (now published as U.S. Patent Application Publication No. 2015/0227731 | USER AUTHENTICATION BASED ON OTHER APPLICATIONS | Concurrently Herewith |
| 14/175,615 (now published as U.S. Patent Application Publication No. 2015/0227726 | USER AUTHENTICATION BASED ON FOB/INDICIA SCAN | Concurrently Herewith |

-continued

| U.S. Patent Application Ser. No. | Title | Filed On |
|---|---|---|
| 14/175,688 (now published as U.S. Patent Application Publication No. 2015/0227730 | USER AUTHENTICATION BASED ON SELF-SELECTED PREFERENCES | Concurrently Herewith |
| 14/175,136 (now published as U.S. Patent Application Publication No. 2015/0229622 | SHUTTING DOWN ACCESS TO ALL USER ACCOUNTS | Concurrently Herewith |
| 14/175,956 (now published as U.S. Patent Application Publication No. 2015/0227724 | SORTING MOBILE BANKING FUNCTIONS INTO AUTHENTICATION BUCKETS | Concurrently Herewith |
| 14/175,962 (now published as U.S. Patent Application Publication No. 2015/0229625 | AUTHENTICATION LEVELS OF FUNCTION BUCKET BASED ON CIRCUMSTANCES | Concurrently Herewith |
| 14/175,771 (now published as U.S. Patent Application Publication No. 2015/0227903 | REMOTE REVOCATION OF APPLICATION ACCESS BASED ON LOST OR MISAPPROPRIATED CARD | Concurrently Herewith |
| 14/175,786 (now published as U.S. Patent Application Publication No. 2015/0227927 | REVOCATION OF APPLICATION ACCESS BASED ON NON-CO-LOCATED | Concurrently Herewith |
| 14/175,672 (now published as U.S. Patent Application Publication No. 2015/0227729 | SELF-SELECTED USER ACCESS BASED ON SPECIFIC AUTHENTICATION TYPES | Concurrently Herewith |
| 14/175,146 (now published as U.S. Patent Application Publication No. 2015/0227725 | PROVIDING AUTHENTICATION USING PREVIOUSLY-VALIDATED AUTHENTICATION CREDENTIALS | Concurrently Herewith |
| 14/175,652 (now published as U.S. Patent Application Publication No. 2015/0227924 | DETERMINING AUTHENTICATION REQUIREMENTS ALONG A CONTINUUM BASED ON A CURRENT STATE OF THE USER AND/OR THE SERVICE REQUIRING AUTHENTICATION | Concurrently Herewith |

What is claimed is:

1. An apparatus for increasing confidence in user authentication based on transaction data indicating that one or more geographically proximate, card-present transactions were recently approved, the apparatus comprising:
 a memory;
 a processor; and
 computer-executable instructions stored in the memory, executable by the processor, and configured to cause the processor to:
  receive from a user, a request to execute a user action associated with an application, wherein execution of the user action requires validation of one or more authentication credentials;
  collect a transaction set of data comprising information related to one or more card-present transactions conducted by the user, the information indicating that the one or more card-present transactions were approved and indicating one or more transaction locations at which the one or more card-present transactions were approved;
  collect a location set of data comprising information related to a physical location of the user;
  determine a current time of day;
  determine a transaction proximity score associated with the user and the one or more card-present transactions, comprising:
   determining a geographic distance between one or more of the card-present transactions represented in the transaction set of data and the location of the user;
   determining an amount of time expired between approval of the one or more card-present transactions and the current time of day;
   determining a proximity threshold associated with the one or more card-present transactions and the amount of time expired;
   determining whether the user is within the proximity threshold based at least in part on the geographic distance; and
   determining the transaction proximity score based at least in part on the determination whether the user is within the proximity threshold;
  determine a level of authentication associated with the determined transaction proximity score, wherein the determined level of authentication increases as the geographic distance increases and decreases as the geographic distance decreases;
  determine which one or more authentication types from a plurality of authentication types are associated with the level of authentication associated with the transaction proximity score;
  request one or more authentication credentials corresponding to the determined one or more authentication types;
  receive one or more authentication credentials from the user;
  validate the one or more authentication credentials, thereby resulting in a successful validation of the one or more authentication credentials; and
  in response to the successful validation of the one or more authentication credentials, execute the user action.

2. The apparatus of claim 1, wherein determining the transaction proximity score further comprises:
 selecting one or more second transactions of the user;
 determining a second proximity threshold associated with the one or more second transactions of the user;
 determining whether the user is within the second proximity threshold; and
 wherein determining the transaction proximity score is further based at least in part on the determination of whether the user is within the second proximity threshold.

3. The apparatus of claim 2, wherein determining the transaction proximity score comprises:
 determining a first partial score based at least in part on the determination of whether the user is within the proximity threshold, wherein the first partial score is weighted by a first weighting factor;
 determining a second partial score based at least in part on the determination of whether the user is within the second proximity threshold, wherein the second partial score is weighted by a second weighting factor; and combining the first partial score and the second partial score, thereby determining the transaction proximity score.

4. The apparatus of claim 3, wherein at least one of the first weighting factor and the second weighting factor are based on the elapsed time since their respective transactions occurred.

5. The apparatus of claim 1, wherein determining the transaction proximity score comprises:
determining a historical transaction pattern associated with the user;
determining whether the transaction set of data indicates a current transaction pattern that falls within a predetermined acceptable variance of the historical transaction pattern; and
if not, determining the transaction proximity score based at least in part on a variance of the current transaction pattern from the historical transaction pattern.

6. The apparatus of claim 1, wherein determining the transaction proximity score comprises:
determining a historical transaction pattern associated with the user;
determining the transaction proximity score based at least in part on a variance of the current transaction pattern from the historical transaction pattern.

7. A method for increasing confidence in user authentication based on transaction data indicating that one or more geographically proximate, card-present transactions were recently approved, the method comprising:
receiving, by a mobile device of a user and from the user, a request to execute a user action associated with an application, wherein execution of the user action requires validation of one or more authentication credentials;
collecting a transaction set of data comprising information related to one or more card-present transactions conducted by the user, the information indicating that the one or more card-present transactions were approved and indicating one or more transaction locations at which the one or more card-present transactions were approved;
collecting, by the mobile device, a location set of data comprising information related to a physical location of the user;
determining a current time of day;
determining, by the mobile device, a transaction proximity score associated with the user and the one or more card-present transactions, comprising:
determining a geographic distance between one or more of the card-present transactions represented in the transaction set of data and the location of the user;
determining an amount of time expired between approval of the one or more card-present transactions and the current time of day;
determining a proximity threshold associated with the one or more card-present transactions and the amount of time expired;
determining whether the user is within the proximity threshold based at least in part on the geographic distance; and
determining the transaction proximity score based at least in part on the determination whether the user is within the proximity threshold;
determining, by the mobile device, a level of authentication associated with the determined transaction proximity score, wherein the determined level of authentication increases as the geographic distance increases and decreases as the geographic distance decreases;
determining, by the mobile device, which one or more authentication types from a plurality of authentication types are associated with the level of authentication associated with the transaction proximity score;
requesting, by the mobile device, from the user one or more authentication credentials corresponding to the determined one or more authentication types;
receiving, by the mobile device and from the user, one or more authentication credentials from the user;
validating, by the mobile device, the one or more authentication credentials, thereby resulting in a successful validation of the one or more authentication credentials; and
in response to the successful validation of the one or more authentication credentials, executing, by the mobile device, the user action.

8. The method of claim 7, wherein determining the transaction proximity score further comprises:
selecting one or more second transactions of the user;
determining a second proximity threshold associated with the one or more second transactions of the user;
determining whether the user is within the second proximity threshold; and
wherein determining the transaction proximity score is further based at least in part on the determination of whether the user is within the second proximity threshold.

9. The method of claim 8, wherein determining the transaction proximity score comprises:
determining a first partial score based at least in part on the determination of whether the user is within the proximity threshold, wherein the first partial score is weighted by a first weighting factor;
determining a second partial score based at least in part on the determination of whether the user is within the second proximity threshold, wherein the second partial score is weighted by a second weighting factor; and
combining the first partial score and the second partial score, thereby determining the transaction proximity score.

10. The method of claim 9, wherein at least one of the first weighting factor and the second weighting factor are based on the elapsed time since their respective transactions occurred.

11. The method of claim 7, wherein determining the transaction proximity score comprises:
determining a historical transaction pattern associated with the user;
determining whether the transaction set of data indicates a current transaction pattern that falls within a predetermined acceptable variance of the historical transaction pattern; and
if not, determining the transaction proximity score based at least in part on a variance of the current transaction pattern from the historical transaction pattern.

12. The method of claim 7, wherein determining the transaction proximity score comprises:
determining a historical transaction pattern associated with the user;
determining the transaction proximity score based at least in part on a variance of the current transaction pattern from the historical transaction pattern.

13. A computer program product for increasing confidence in user authentication based on transaction data indicating that one or more geographically proximate, card-present transactions were recently approved, the computer program product comprising a non-transitory computer-readable medium comprising code causing a first apparatus to:

receive from a user, a request to execute a user action associated with an application, wherein execution of the user action requires validation of one or more authentication credentials;

collect a transaction set of data comprising information related to one or more card-present transactions conducted by the user, the information indicating that the one or more card-present transactions were approved and indicating one or more transaction locations at which the one or more card-present transactions were approved;

collect a location set of data comprising information related to a physical location of the user;

determine a current time of day;

determine a transaction proximity score associated with the user and the one or more card-present transactions, comprising:

determining a geographic distance between one or more of the card-present transactions represented in the transaction set of data and the location of the user;

determining an amount of time expired between approval of the one or more card-present transactions and the current time of day;

determining a proximity threshold associated with the one or more card-present transactions and the amount of time expired;

determining whether the user is within the proximity threshold based at least in part on the geographic distance; and determining the transaction proximity score based at least in part on the determination whether the user is within the proximity threshold;

determine a level of authentication associated with the determined transaction proximity score, wherein the determined level of authentication increases as the geographic distance increases and decreases as the geographic distance decreases;

determine which one or more authentication types from a plurality of authentication types are associated with the level of authentication associated with the transaction proximity score;

request one or more authentication credentials corresponding to the determined one or more authentication types;

receive one or more authentication credentials from the user;

validate the one or more authentication credentials, thereby resulting in a successful validation of the one or more authentication credentials; and in response to the successful validation of the one or more authentication credentials, execute the user action.

14. The computer program product of claim 13, wherein determining the transaction proximity score further comprises:

selecting one or more second transactions of the user;

determining a second proximity threshold associated with the one or more second transactions of the user;

determining whether the user is within the second proximity threshold; and wherein determining the transaction proximity score is further based at least in part on the determination of whether the user is within the second proximity threshold.

15. The computer program product of claim 14, wherein determining the transaction proximity score comprises:

determining a first partial score based at least in part on the determination of whether the user is within the proximity threshold, wherein the first partial score is weighted by a first weighting factor;

determining a second partial score based at least in part on the determination of whether the user is within the second proximity threshold, wherein the second partial score is weighted by a second weighting factor; and combining the first partial score and the second partial score, thereby determining the transaction proximity score.

16. The computer program product of claim 15, wherein at least one of the first weighting factor and the second weighting factor are based on the elapsed time since their respective transactions occurred.

17. The computer program product of claim 13, wherein determining the transaction proximity score comprises:

determining a historical transaction pattern associated with the user;

determining whether the transaction set of data indicates a current transaction pattern that falls within a predetermined acceptable variance of the historical transaction pattern; and if not, determining the transaction proximity score based at least in part on a variance of the current transaction pattern from the historical transaction pattern.

* * * * *